United States Patent [19]

Cook

[11] 4,094,205
[45] June 13, 1978

[54] COMBINED BELT AND HYDROSTATIC VEHICLE DRIVE

[75] Inventor: Charles Edward Cook, Hampton, Ill.

[73] Assignee: Deere & Company, Moline, Ill.

[21] Appl. No.: 790,444

[22] Filed: Apr. 25, 1977

[51] Int. Cl.² .............................................. F16H 7/12
[52] U.S. Cl. ............................................ 74/242.1 FP
[58] Field of Search ................ 74/242.1 FP, 242.1 A, 74/242.1 R, 230.17 F

[56] References Cited

U.S. PATENT DOCUMENTS

| 3,881,370 | 5/1975 | Vogelaar et al. | 74/230.17 F |
| 3,938,400 | 2/1976 | Konyha | 74/242.1 R |

*Primary Examiner*—Leonard H. Gerin

[57] ABSTRACT

A self-propelled combine has a power source that is connected to a hydrostatic drive for the drive wheels by means of a belt drive, that includes a pair of coaxial idler sheaves mounted on a freely swingable arm, one sheave being connected to an input sheave by a first belt and the other idler sheave being connected by a second drive belt to an output sheave that drives the pump of the hydrostatic drive. The arm that mounts the idler sheaves is articulated, and a hydraulic cylinder between the two sections of the arm controls the distance between the idler sheave axis and the arm pivot, which in turn controls the tension in the two belts. The hydraulic cylinder is connected to the high pressure side of the hydrostatic drive so that the cylinder exerts a belt tensioning force that is proportional to the pressure in the high pressure side of the hydrostatic drive, whereby an increase in pressure in the hydrostatic drive as a result of increased torque required to propel the combine increases the belt tension in the belt drive.

10 Claims, 2 Drawing Figures

COMBINED BELT AND HYDROSTATIC VEHICLE DRIVE

BACKGROUND OF THE INVENTION

This invention relates to a combined belt and hydrostatic drive, such as is used to propel a self-propelled agricultural vehicle, such as a combine or the like.

It is known to utilize a variable speed, reversible hydrostatic drive to propel a combine or the like, the hydrostatic drive providing variable speeds within a limited range and being connected to the drive wheels by a conventional multi-speed transmission, so that the combine speed is infinitely variable within the different transmission ranges. Conventionally, the pump in the hydrostatic drive in such a system is connected to the engine by a belt drive system.

With the increasing size and load carrying capacity of modern combines, there has been an attendant increase in the power required to propel the combine, and the increased power requirement has created a problem in providing adequate capacity and durability in the drive belts. In some combines, the variable speed characteristics in the different drive ranges is provided by an infinitely variable belt drive, and it is known to provide a torque sensing mechanism in such a belt drive so that the belt tension is maintained at a lower level when there is a lesser torque demand on the drive system, with the belt tension automatically being increased in response to increased torque demand, so that the high belt tensions that reduce belt life are only applied when necessary. Such a torque sensing variable speed drive is disclosed in U.S. Pat. No. 3,881,370, which is also assigned to the assignee herein. However, to date, there has been no such a torque sensing device for the belt drive in a drive system for a combine or the like that includes a hydrostatic drive.

SUMMARY OF THE INVENTION

According to the present invention, there is provided an improved belt drive system for driving the pump of a hydrostatic drive in a self-propelled vehicle, whereby the belt tension is automatically responsive to the pressure in the hydrostatic drive, so that the belt tension in the belt drive system is maintained at a high level only when the torque demands for driving the vehicle require the higher belt tension. An important feature of the invention resides in the increased belt life as a result of using belt tensions that are proportional to the torque demands on the drive system, so that relatively low belt tensions can be utilized in normal operating conditions.

Also according to the invention, idler means are provided in the belt drive system, and the position of the idler means is controlled by a hydraulic cylinder so that extension of the cylinder increases the belt tension, the cylinder in turn being connected to the high pressure side of the hydrostatic drive so that increasing pressure in the hydrostatic drive automatically causes extension of the cylinder and increases belt tension. More specifically, a pair of idler sheaves in the belt drive system are mounted on a swingable, articulated arm, and the hydraulic cylinder interconnects the two two-arm sections so that actuation of the cylinder causes a change in the distance between the arm pivot and the sheave axis to thereby change the belt tension.

Another feature of the invention resides in the provision of a sensing line to each side of the pump in a closed loop hydrostatic drive, control valve means being provided to connect the line to the hydraulic cylinder only to the sensing line having the highest pressure, so that the torque sensing drive will operate in either forward or reverse or when the drive is being used to brake the vehicle.

Still another feature resides in the provision of spring means for providing a minimum belt tension, so that sufficient belt tension is provided to drive the hydrostatic pump even when the hydrostatic drive is in neutral or when there is very little pressure in the hydrostatic drive system.

DESCRIPTION OF THE PREFERRED EMBODIMENT

Figure 1:
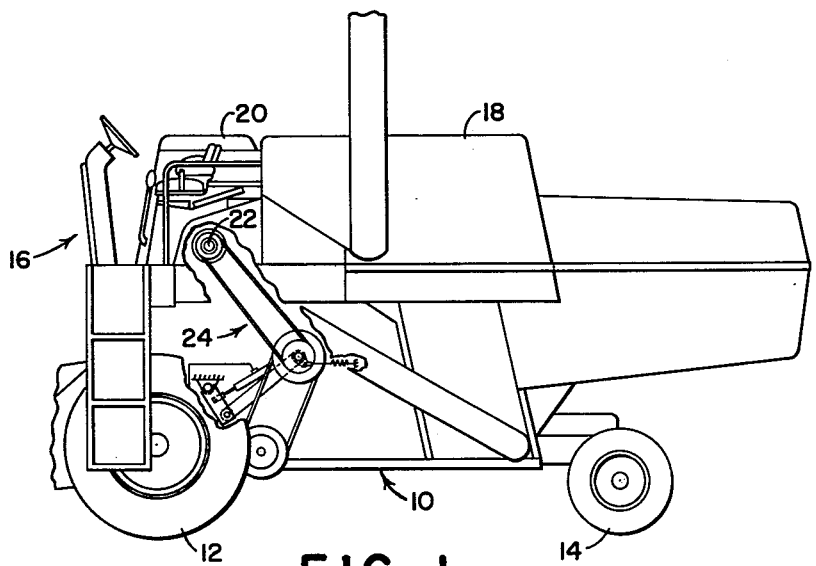
FIG. 1 is a side elevation of a self-propelled combine embodying the improved drive system, with portions of the combine being broken away to more clearly show the invention.
Figure 2:
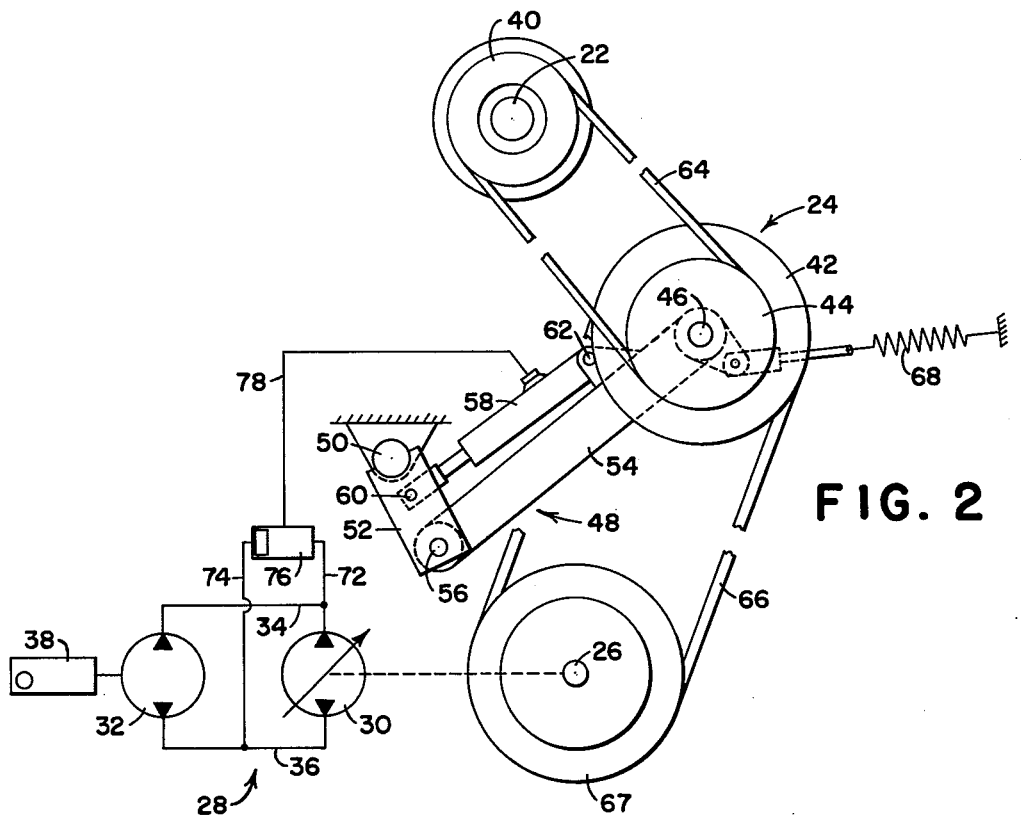
FIG. 2 is an enlarged, partly schematic, side elevation view of the improved belt drive combined with the hydrostatic drive.

The invention is embodied in a self-propelled combine having a mobile main frame, indicated generally by the numeral 10, the frame being mounted on a pair of forward drive wheels 12 and steerable rear wheels 14. The combine has a forward elevated operator's station 16, an elevated grain tank 18 immediately to the rear of the operator's station, and an engine enclosure 20 at the right side of the combine forwardly of the grain tank adjacent to the operator's station. An internal combustion engine (not shown) is mounted in the enclosure 20 and includes a transverse output shaft 22 that drives a belt drive 24 for the vehicle propulsion system. The belt drive includes a transverse output shaft 26 rearwardly adjacent to the left drive wheel 12, and the shaft 26 serves as the input shaft to a hydrostatic drive, indicated in its entirety by the numeral 28.

As is well known, the hydrostatic drive 28 includes a variable speed reversible pump 30, a motor 32 and a pair of hydraulic lines 34 and 36 that connect the opposite sides of the pump to the opposite sides of the motor to form a closed loop. The hydrostatic drive provides infinitely variable and reversible speeds within a limited range, and the motor 32 is connected to a gear type change speed transmission 38, which in turn is connected to the drive wheels 12, the hydrostatic drive 28 and transmission 38 being of well known construction.

The belt drive 24 includes a drive sheave 40 on the engine output shaft 22 and a pair of coaxially connected idler sheaves 42 and 44 that are mounted on a transverse idler shaft 46 carried at one end of an arm 48 that is swingably mounted on the main frame 10 by means of a transverse pivot 50. The arm 48 is articulated and includes an inner section 52, that is mounted on the pivot 50, and an outer section 54, that is connected to the free end of the inner section 52 by means of a transverse pivot 56 and carries the idler sheaves 42 and 44. A hydraulic cylinder 58 has its piston end connected to the inner arm sections 52 by means of a pivot 60 between the pivot 50 and the pivot 56 and its outer or cylinder end connected to the outer arm section 54 by means of a pivot 62 adjacent the outer end of the arm. As is apparent, extension or retraction of the cylinder 58 changes the distance between the arm pivot 50 and the idler shaft 46 to change the effective length of the arm 48.

An upper belt 64 connects the drive sheave 40 to the idler sheave 44, and a lower belt 66 drivingly connects the idler sheave 42 to a driven sheave 67 on the belt drive output shaft 26, the idler 44 being drivingly connected to the idler 42 so that the hydrostatic pump 30 is driven by the engine at a fixed ratio. A tension spring 68 is connected to the end of the outer arm section 54 to bias the idlers rearwardly and provide a minimum belt tension in the belts 64 and 66. Since the arm 48 is free to swing about the pivot 50, the tension in the two belts 64 and 66 would tend to equalize.

A first sensing line 72 is connected to the hydrostatic drive line 34, and a second sensing line 74 is connected to the hydrostatic drive line 36. The lines 72 and 74 are connected to the opposite ends of a shuttle valve 76, that has an output line 78 connected to the cylinder end of the hydraulic cylinder 58. The shuttle valve 76 is of conventional construction and operates to connect whichever of the lines 72 or 74 that has the highest pressure to the hydraulic cylinder line 78, so that the pressure in the high pressure side of the hydrostatic drive is applied to the hydraulic cylinder 58.

In operation, when there is very little pressure in either side of the hydrostatic drive, the spring 68 biases the outer arm section 54 and consequently the idlers 42 and 44 rearwardly to supply a certain minimum belt tension in the drive belts 64 and 66.

In normal forward operation of the combine, the hydrostatic drive line 34 is the high pressure line and the line 36 is the return line, so that the shuttle valve 76 connects the line 72 to the cylinder line 78 to automatically apply the hydraulic pressure in the line 34 to the cylinder. The cylinder 58 applies a force that would tend to extend the arm 48, so that the idlers 42 and 44 exert a rearward biasing force that tensions the belts 64 and 66 in proportion to the force exerted by the cylinder 58 and consequently the pressure in the line 34. The cylinder size and location is selected so that in normal operation the belt tension is sufficient to eliminate belt slip while being low enough that the belts will not be unduly stressed. If, due to difficult driving conditions or where the combine is being driven up an incline, the torque demands on the hydrostatic drive are such that the pressure in the line 34 increases, the pressure in the cylinder 58 automatically increases in proportion to the increase in pressure in the line 34, and the increased pressure tends to extend the cylinder to exert a greater rearward force on the idler sheaves 42 and 44, consequently increasing the belt tension. The increased tension is sufficient to eliminate belt slippage even though a greater torque is being transmitted through the belt drive. When the temporary high torque demand is relieved, the pressure in the cylinder 58 automatically decreases, so that the belt tension also automatically decreases to a level commensurate with the torque in the drive system. If the combine is being operated in reverse, or if the hydrostatic drive 28 is being used to brake the combine, such as when the machine is moving downhill, the line 36 becomes the high pressure line, in which case, the shuttle valve 76 shifts to connect the sensing line 74 to the cylinder, so that the belt tension is proportional to the pressure in the line 36, which is again a function of the torque in by the drive system.

I claim:

1. In a self-propelled vehicle having a power source, a belt drive means connected to and driven by the power source, a variable ratio hydrostatic drive including a pump, connected to and driven by the belt drive means, a motor, and a hydraulic conduit means connecting the pump to the motor, and means connecting the motor to the vehicle drive wheels, the improvement comprising: a belt tensioning means associated with the belt drive means and including a belt engaging element shiftable in opposite directions to respectively increase or decrease the belt tension in the belt drive means; a hydraulic actuator operatively connected to the belt engaging element for exerting a force thereon that urges the element in a tension increasing direction; and means operatively connecting the hydraulic actuator to the conduit means of the hydrostatic drive so that the force exerted by the hydraulic actuator and consequently the belt tension is responsive to the pressure in the conduit means.

2. The invention defined in claim 1 wherein the belt drive means includes a drive sheave connected to the power source, a driven sheave connected to the pump, a pair of connected idler sheaves, a first drive belt drivingly connecting the drive sheave to one idler sheave, and a second drive belt drivingly connecting the other idler sheave to the driven sheave, said idler sheaves forming said belt engaging elements, the belt tensioning means including arm means pivotally mounted on the vehicle for swinging about an axis parallel to axes of the idler sheaves and rotatably carrying said idler sheaves so that the tensioning forces exerted by the idler sheaves is applied to both drive belts.

3. The invention defined in claim 2 wherein the arm means includes a first arm element pivotally mounted on the vehicle, a second arm element pivotally connected to the first arm element and carrying said sheaves, the hydraulic actuator comprising a hydraulic cylinder assembly having its opposite ends respectively connected to the first and second arm elements so that actuation of the cylinder assembly changes the distance between the pivoted connection of the arm means on the vehicle and the axes of the idler sheaves.

4. The invention defined in claim 3 and including a spring means operatively connected to the second arm element for biasing the idler sheaves in a belt tensioning direction to provide a predetermined minimum belt tension.

5. The invention defined in claim 4 wherein the conduit means includes first and second hydraulic conduits connecting the pump and motor in a closed loop and the means connecting the hydraulic actuator to the conduit means includes first and second lines respectively connected to the first and second conduits and shuttle valve means connecting the hydraulic line having the higher pressure to the hydraulic actuator.

6. The invention defined in claim 1 wherein the conduit means includes first and second hydraulic conduits connecting the pump and motor in a closed loop and the means connecting the hydraulic actuator to the conduit means includes first and second lines respectively connected to the first and second conduits and shuttle valve means connecting the hydraulic line having the higher pressure to the hydraulic actuator.

7. In a self-propelled harvesting machine having a power source, a belt drive including a drive sheave connected to and driven by the power source, a first drive belt driven by the drive sheave, a driven sheave, and a second drive belt drivingly connected to the driven sheave, a variable ratio hydrostatic drive including a pump connected to and driven by the driven sheave, a motor, and a hydraulic conduit means connecting the pump to the motor, and means connecting the motor to the harvesting machine drive wheels, the improvement comprising: an arm means pivotally mounted on the harvesting machine for swinging about an axis parallel to the axis of the drive and driven sheaves; a pair of connected idler sheaves mounted on the arm means and respectively engaging the first and second belts; a hydraulic cylinder operatively connected to the idler sheaves for exerting a force thereon that urges the sheaves in a belt tension increasing direction; and means operatively connecting the hydraulic cylinder to the conduit means of the hydrostatic drive so that the force exerted by the hydraulic cylinder and consequently the belt tension is responsive to the pressure in the conduit means.

8. The invention defined in claim 7 wherein the arm means includes a first arm element pivotally mounted on the vehicle, a second arm element pivotally connected to the first arm element and carrying said sheaves, the hydraulic actuator comprising a hydraulic cylinder assembly having its opposite ends respectively connected to the first and second arm elements so that actuation of the cylinder assembly changes the distances between the pivotal connection of the arm means on the vehicle and the axes of the idler sheaves.

9. The invention defined in claim 8 and including a spring means operatively connected to the second arm element for biasing the idler sheaves in a belt tensioning direction to provide a predetermined minimum belt tension.

10. The invention defined in claim 9, wherein the conduit means includes first and second hydraulic conduits connecting the pump and motor in a closed loop and the means connecting the hydraulic actuator to the conduit means includes first and second lines respectively connected to the first and second conduits and shuttle valve means connecting the hydraulic line with the higher pressure to the hydraulic actuator.

* * * * *